US011152839B2

(12) United States Patent
Sturman

(10) Patent No.: US 11,152,839 B2
(45) Date of Patent: Oct. 19, 2021

(54) HYDRAULICALLY POWERED ELECTRIC GENERATORS

(71) Applicant: Sturman Digital Systems, LLC, Woodland Park, CO (US)

(72) Inventor: Oded Eddie Sturman, Marana, AZ (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 0 days.

(21) Appl. No.: 16/948,675

(22) Filed: Sep. 28, 2020

(65) Prior Publication Data

US 2021/0013776 A1 Jan. 14, 2021

Related U.S. Application Data

(63) Continuation of application No. PCT/US2019/028519, filed on Apr. 22, 2019.

(60) Provisional application No. 62/661,532, filed on Apr. 23, 2018.

(51) Int. Cl.
*H02K 7/18* (2006.01)
*F03B 13/00* (2006.01)
*H02K 11/00* (2016.01)
*A01G 25/16* (2006.01)

(52) U.S. Cl.
CPC ........... *H02K 7/1876* (2013.01); *F03B 13/00* (2013.01); *H02K 11/0094* (2013.01); *A01G 25/16* (2013.01)

(58) Field of Classification Search
CPC ............. H02K 7/1876; H02K 11/0094; H02K 1/2793; H02K 1/182; H02K 21/24; H02K 21/026; H02K 7/1869; F03B 13/00
See application file for complete search history.

(56) References Cited

U.S. PATENT DOCUMENTS

| 4,500,827 | A | 2/1985 | Merritt et al. |
| 7,898,119 | B2 | 3/2011 | Sato |
| 8,390,137 | B2 | 3/2013 | Bryfogle |
| 8,596,230 | B2 | 12/2013 | Sturman et al. |
| 9,206,738 | B2 | 12/2015 | Sturman |

(Continued)

FOREIGN PATENT DOCUMENTS

| WO | 2011046975 A1 | 4/2011 |
| WO | 2012177795 A2 | 12/2012 |

(Continued)

OTHER PUBLICATIONS

International Search Report and Written Opinion of the International Searching Authority dated Aug. 16, 2019; International Application No. PCT/US2019/028519; 10 pages total.

*Primary Examiner* — Viet P Nguyen
(74) *Attorney, Agent, or Firm* — Womble Bond Dickinson (US) LLP

(57) ABSTRACT

Methods and systems of operating hydraulically powered electric generators are disclosed. The hydraulically powered electric generators comprise opposing stators spaced apart by an armature. The armature is positioned against a first stator. A conduction path is established through a coil of the first stator. The armature is magnetically held against the first stator for a specific time period. The armature is hydraulically moved away from the first stator to capture electrical energy resulting from a collapse in magnetic field in the first stator and the armature.

24 Claims, 4 Drawing Sheets

(56) References Cited

U.S. PATENT DOCUMENTS

| | | |
|---|---|---|
| 9,464,569 B2 | 10/2016 | Sturman |
| 10,352,228 B2 | 7/2019 | Sturman |
| 2011/0083643 A1 | 4/2011 | Sturman et al. |
| 2012/0318239 A1 | 12/2012 | Sturman |
| 2013/0025570 A1 | 1/2013 | Sturman |
| 2014/0191595 A1* | 7/2014 | Miles .................... H02K 7/075 310/15 |
| 2017/0022882 A1 | 1/2017 | Sturman |
| 2019/0284987 A1 | 9/2019 | Sturman |
| 2020/0011251 A1 | 1/2020 | Sturman |

FOREIGN PATENT DOCUMENTS

| | | |
|---|---|---|
| WO | 2013019446 A2 | 2/2013 |
| WO | 2015154051 A1 | 10/2015 |
| WO | 2018176041 A1 | 9/2018 |

* cited by examiner ial Application No. PCT/US2019/028519 filed on Apr. 22, 2019, which claims the benefit of U.S. Provisional Application No. 62/661,532 filed on Apr. 23, 2018, the disclosures of which are incorporated herein by reference.

TECHNICAL FIELD

Embodiments of the present disclosure relate generally to electric generators. More particularly, embodiments of the present disclosure relate to hydraulically powered electric generators.

BACKGROUND

In recent years, there has been a surge of interest in alternative energy sources for generating electricity. Such an interest in alternative energy sources may involve applications in hybrid propulsion systems for motor vehicles where various forms of energy may be generated, used and/or stored for later use (e.g., by way of batteries, hydraulic accumulators, air pressure storage tanks, etc.), and applications beyond hybrid power sources, such as internal combustion engines that generate high pressure hydraulic fluid as a direct output of the engine.

Hydraulic electric generators are well known in the prior art and they typically involve one or more hydraulic pumps combined with a hydraulic motor that is coupled to a generator to generate electricity. For example the hydraulic motor can convert hydraulic pressure pressurized by the hydraulic pump(s) into torque or rotation. Generally, prior art hydraulic electrical generating systems generate electricity directly through either a mechanical gear drive train or a direct-drive connection, where there is a direct link between the rotors and the generator. However, such systems would first need to convert hydraulic energy to rotary energy and use the rotary energy to power a conventional generator.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
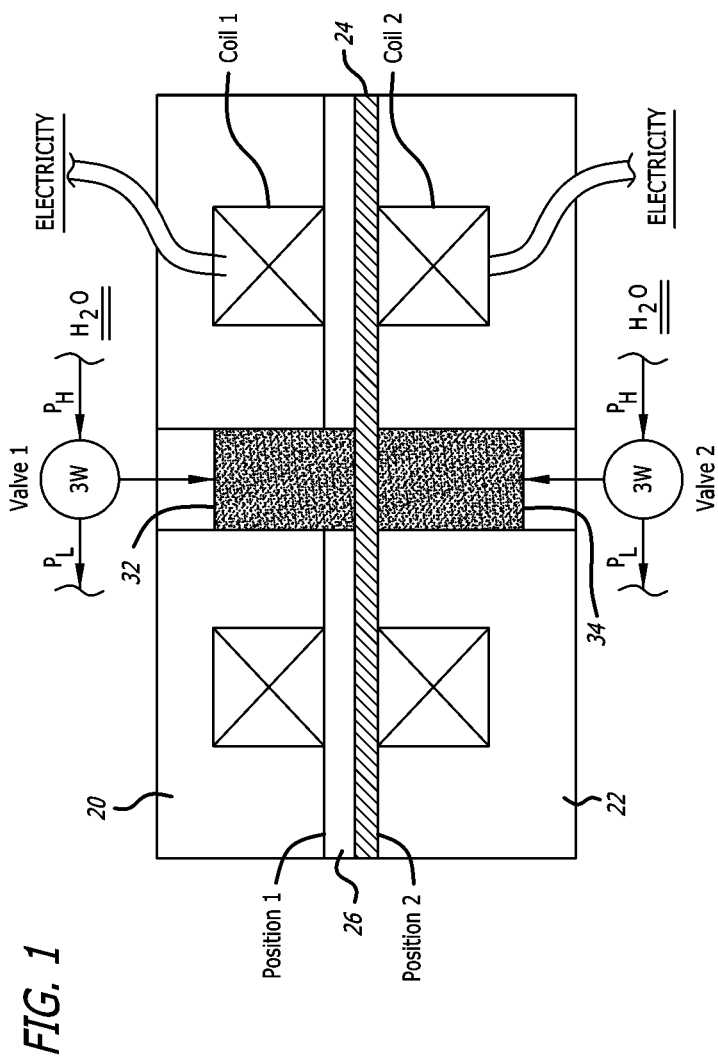
FIG. 1 is a diagram illustrating an example of hydraulically powered electric generators according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The present disclosure comprises hydraulically powered electric generators for a direct conversion of hydraulic energy to electrical energy without first converting the hydraulic energy to rotary energy and using the rotary energy to power a conventional generator.

According to one aspect, methods of operating hydraulically powered electric generators are described. The hydraulically powered electric generators comprise opposing stators spaced apart by an armature. The armature is positioned against a first stator. A conduction path is established through a coil of the first stator. The armature is hydraulically moved away from the first stator to capture electrical energy resulting from a collapse in magnetic field in the first stator and the armature.

In one embodiment, the armature is magnetically held against the first stator for a specific time period. In one embodiment, a first switching device coupled to the coil of the first stator is forward biased to provide the conduction path through the coil of the first stator. In one embodiment, the coil of the first stator is coupled to an electrical energy utilization or storage device (e.g., a battery) having a first polarity. In one embodiment, after the specific time period, the electrical energy utilization or storage device is disconnected, and then the armature is hydraulically moved away from the first stator to initiate an opening of an air gap between the first stator and the armature. In one embodiment, before a maximum air gap between the first stator and the armature is achieved, the electrical energy utilization or storage device is reconnected, where the electrical energy utilization or storage device has a second polarity opposite of the first polarity. In one embodiment, the electrical energy utilization or storage device is coupled to the coil of the first stator through a second switching device to pass electrical current to charge the electrical energy utilization or storage device. In one embodiment, when the maximum air gap between the first stator and the armature is achieved, the first switching device is switched out to allow the magnetic field to collapse. The energy in the magnetic field is captured through the second switching device to charge the electrical energy utilization or storage device.

In one embodiment, the electrical current in the coil of the first stator and the flux yielding the flux density linking the first stator and the armature rise quickly during the specific time period. In one embodiment, the coil of the first stator has a shady effect on the magnetic field in the first stator and the armature, and a circulating current is generated in the coil to resist and slow the collapse of the magnetic field. In one embodiment, the armature is moved away from the first stator to a second stator. In one embodiment, position of the armature is controlled by hydraulic pistons comprised in the hydraulically powered electric generators. Each hydraulic piston is coupled to a source of high pressure hydraulic fluid (e.g., hemp, water, ammonia (NH3), etc.) and a low pressure reservoir or vent through a three-way valve. In one embodiment, a forward conduction voltage drop of the second switching device charging the electrical energy utilization or storage device is injected. In one embodiment, the coil of the first stator is coupled to the electrical energy utilization or storage device through a second switching device, the electrical energy utilization or storage device having a second polarity opposite of the first polarity.

In one embodiment, after the specific time period, the first switching device is switched out, and then the armature is hydraulically moved away from the first stator to initiate an opening of an air gap between the first stator and the armature, whereby less energy is temporarily stored in the air gap. In one embodiment, the coil of the first stator is coupled to an electrical energy utilization or storage device having a first polarity. In one embodiment, after the specific time period, the electrical energy utilization or storage device is disconnected from the coil of the first stator. In one embodiment, the electrical energy utilization or storage device and a second switching device are reconnected, and then the armature is hydraulically moved away from the first stator, where the coil of the first stator is coupled to the electrical energy utilization or storage device through the second switching device, whereby energy is recovered by the electrical energy utilization or storage device through the second switching device.

According to another aspect, methods of operating hydraulically powered electric generators are described. The hydraulically powered electric generators comprise opposing stators spaced apart by a hydraulically controlled armature and an air gap, with each of the opposing stators having at least one coil. The hydraulically controlled armature is positioned against one of the stators. Electrical current in a coil of the stator is established to establish a magnetic field in the stator and the armature, during which a first diode coupled to the coil is reverse biased. A conduction path through the coil is established, where the first diode is forward biased to provide the conduction path through the coil. The armature is hydraulically forced away from the stator to capture electrical energy resulting from a collapse in magnetic field in the stator and the armature. In one embodiment, the armature is hydraulically controlled using hemp, water, and/or ammonia (NH3).

According to still another aspect, methods of operating hydraulically powered electric generators are described. The generators comprise opposing stators spaced apart by a hydraulically controlled armature and an air gap, each of the opposing stators having at least one coil. The hydraulically controlled armature is caused to position against one of the stators. A conduction path is established through a coil of the stator, where the coil is connected to a battery. The battery is disconnected from the coil after the conduction path is established for a first specific time period. After a second specific time period, the battery and a diode are reconnected where the battery is connected to the coil through the diode. Then, the armature is hydraulically moved away from the stator to capture electrical energy resulting from a collapse in magnetic field in the stator and the armature.

According to yet another aspect, methods of operating hydraulically powered electric generators are disclosed. The generators comprise opposing stators spaced apart by a hydraulically controlled armature and an air gap, with each of the opposing stators having at least one coil. The hydraulically controlled armature is caused to position against one of the stators. A conduction path through a coil of the stator is established for a specific time period, with the coil being connected to a battery through a diode, where the diode is reverse biased. Then, the armature is hydraulically moved away from the stator to initiate an opening of the air gap and to capture electrical energy resulting from a collapse in magnetic field in the stator and the armature.

One embodiment of the invention may be seen in FIG. 1, which is a diagram illustrating an example of hydraulically powered electric generators (or hydraulically powered electric generating system) according to one embodiment. As shown, two opposing stators 20 and 22 with Coils 1 and 2 therein, respectively, face each other and are spaced apart by a combination of an armature 24 plus an airgap 26. Controlling the position of the armature 24 are hydraulic pistons 32 and 34, each coupled to a source of high pressure hydraulic fluid $P_H$ and a low pressure reservoir or vent $P_L$ by way of three-way valves 3W, namely Valve 1 and Valve 2, respectively. Accordingly, by appropriate control of the three-way valves, both pistons 32 and 34 may be coupled to the high pressure hydraulic fluid $P_H$ (e.g., hemp, water, ammonia (NH3), etc.), or both coupled to the low pressure hydraulic fluid $P_L$ (e.g., hemp, water, ammonia (NH3), etc.), either condition of which will not move the stator in either direction, assuming the hydraulic forces are balanced at either of these two positions, or alternatively either hydraulic piston 32 or 34 may be coupled to the high hydraulic fluid $P_H$ with the opposite piston being coupled to the low pressure hydraulic fluids $P_L$, with the higher pressure determining the movement and final position of the armature 24. Three-way valves, valves 1 and 2, should be high speed valves, and the pressure difference between $P_H$ and $P_L$ is adequate to provide high speed movement of the armature, as the faster the movement of the armature 24, the better the performance of the hydraulically powered electric generators of the present invention.

The method of the invention in accordance with one embodiment is to position armature 24 against one of the stators, say stator 20 in this example, and then with a magnetic field in the armature 24 and stator 20 linking Coil 1 and while coupling the respective coil, Coil 1 in this example, either to an electrical energy utilization or storage device such as a battery (hereinafter, simply battery), quickly hydraulically moving the armature 24 to the opposite stator 22 to capture the electrical energy resulting from the collapse of the magnetic field in, and in the airgap between, stator 20 and armature 24, as the magnetic field in the magnetic materials and the airgap collapses.

The method of another embodiment of the invention is to magnetically hold the armature 24 against stator 20, either by a small holding current in the respective coil or by residual magnetism using the retentively of the armature and stator material, and then while coupling Coil 1 to the battery, quickly moving the armature 24 to the opposite stator 22 to capture the electrical energy resulting from the collapse of the magnetic field in, and in the airgap between, stator 20 and armature 24, as the magnetic field in the magnetic materials and the airgap collapses. Alternatively, Coil 1 may be simply shorted during the movement of the armature 24 and then immediately coupled to the electrical energy utilization or storage device to recover the energy in the magnetic field, either at the end of the travel of the armature 24 (maxim air gap) or before the armature reaches its maximum air gap position. These and other alternatives will be subsequently described in greater detail.

As pointed out above, the magnetic energy potentially available for capture as electrical energy in the above examples is the magnetic energy in the magnetic field in stator 20 and armature 24 and in the airgap between stator 20 and armature 24, to be recovered as the magnetic field in the magnetic materials and the air gap collapses. In general, the energy density per unit volume of a magnetic field is:

$$\text{energy/unit volume} = B^2/2\mu$$

where: B is the flux density in the volume, and

μ is the permeability of the volume

Normally one would use a magnetic material or materials for the stator and armature having a high permeability, as many if not most high permeability magnetic materials exhibit adequate retentivity in a zero air gap circuit (zero demagnetization force) to maintain an adequate magnetization until the air gap is starting to be imposed, and a high permeability will minimize the electrical energy required to magnetize the magnetic circuit at the initial zero air gap, and will allow substantially complete collapse of the magnetic field when an air gap is imposed if that collapse is not initially impeded as subsequently discussed.

Figure 2:
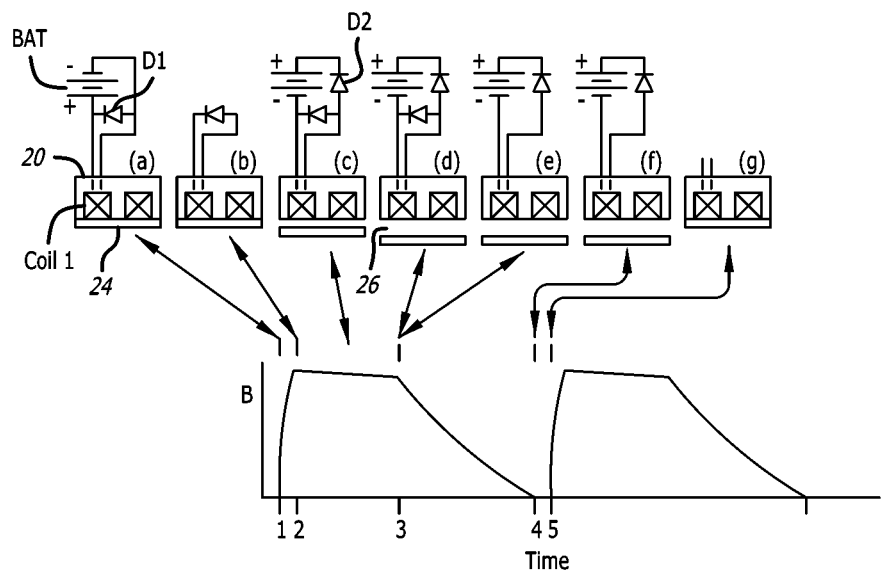
FIG. 2 is a schematic diagram illustrating a method of operating the hydraulically powered electric generators according to one embodiment.

The foregoing is a cursory overview of the theory and operation of the hydraulic electrical generators of the present invention. A more detailed explanation of various considerations and various methods of operation of such a hydraulic electrical generators will be provided by way of reference to FIG. 2 and subsequent Figs. In that regard, FIG. 2 is simply a schematic illustration of a single stator such as stator 20 with Coil 1 therein, but not illustrating the source of the force causing the movement of armature 24. Obviously, as a preferred embodiment, it would be a hydraulic source such as that illustrated with respect to FIG. 1, and which preferably, though not as a limitation of the invention, would be double-acting as illustrated in FIG. 1, though in some embodiments wherein maximum power is not required, a spring return of the armature 24 could be used. In such a single stator case, there is no residual magnetism that the spring return would need to overcome, as any residual magnetism in the armature 24 and stator 20 would assist in the return of the stator to the initial position shown in FIG. 2(*a*), as opposed to resisting that return.

In FIG. 2(*a*), a current is established in Coil 1 to establish a magnetic field in the stator 20 and armature 24, during which diode D1 is back or reverse biased. However since the back EMF that will be generated on the collapse of the magnetic field will be of opposite polarity from the voltage that established the magnetic field, the diode D1 (or its equivalent) will be forward biased to provide a conduction path through Coil 1 for a back EMF so long as the diode remains in the circuit. In this embodiment, it is extremely important that this conduction path be established before the armature is forced away from the stator as illustrated in FIGS. 2(*b*)-2(*d*), and preferably be maintained until the maximum air gap 26 is established. The reason for this is that if such a conduction path is not established before any air gap is established, there will be a premature rapid collapse of the magnetic field, at least premature for purposes of the present invention, and the back EMF generated will be a very high voltage is not contained. However Coil 1, if conducting, will have a shading effect on that magnetic field, generating a circulating current in that coil which resists and slows the collapse of the magnetic field in the air gap. In essence, this circulating current in the coil has a shading effect on the center pole of the magnetic circuit, slowing the rate of collapse of the magnetic field because of its resistance to a change in the flux in the center pole of the stator. This effect is much like that used in fractional horsepower motors of the shaded pole type. If the coil resistance could be made zero, then any change in the flux linking the coil would generate a current in the coil opposing that change so that the flux linking the coil could not be changed until the circuit is opened to block that current.

In the embodiment being described and as shown in the graph at the lower part of FIG. 2, when the magnetizing current is imposed at time T1 as shown in FIG. 2(*a*), the current in Coil 1 and the flux yielding the flux density B linking the stator 20 and armature 24 rise quickly, and shortly thereafter at time T2, the battery BAT is disconnected and the rapid opening of the air gap 26 is, in this embodiment, immediately initiated (FIG. 2(*b*)). Then before the maximum air gap 26 is achieved, the battery BAT is reconnected, but this time with the opposite polarity, and connected through a second diode D2 to pass current to charge the battery, but to block current tending to discharge the battery. Because of the resistance of Coil 1 and the voltage drop across diode D1, there will be some decline in the flux density B in the stator and armature and in the air gap as illustrated in the curve, though if the armature movement is sufficiently rapid, this decrease in flux density B may be reduced or minimized.

At time T3 when the maximum air gap is achieved, diode D1 is immediately switched out of the circuit and the magnetic field is allowed to collapse, with the energy in the magnetic field being captured through diode D2 to charge the battery BAT. Note that without diode D2, when the flux density falls to substantially zero, the back EMF charging the battery will fall below the battery voltage, so that without Diode D2, the battery current would simply reverse direction from charging to discharging and start to magnetize the magnetic circuit in a polarity opposite to that desired (opposite to that provided by the connections of FIG. 2(*a*)).

Figure 3:
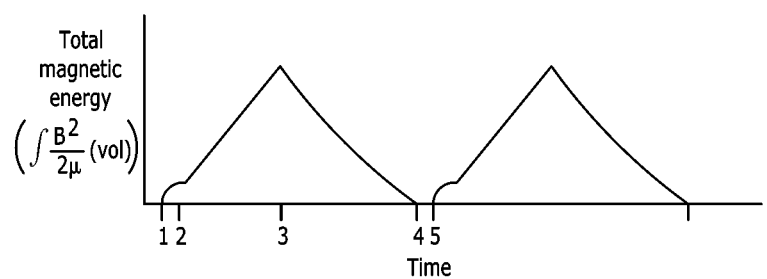
FIG. 3 is a diagram illustrating the total magnetic energy in the system throughout of the operation of the hydraulically powered electric generators.

FIG. 3 schematically illustrates the total magnetic energy in the system throughout the operation of the hydraulically powered electric generators in accordance with foregoing description of FIGS. 2(*a*)-(*g*). Between times T1 and T2, the stator 20 and armature 24 are initially magnetized, but because of the high permeability μ of the materials and the absence of an air gap between the stator and armature, very little energy is needed to initially magnetize the stator and armature, and of course very little magnetic energy is stored in the system. Now when the armature is forced to the maximum air gap position at T3 while diode D1 is conducting, a large amount of energy is stored in the magnetic field, most in the magnetic field in the air gap because of low permeability of the air gap. While there will be some decrease in the flux density during this time, as illustrated in FIG. 2, due primarily to the voltage drop in the diode D1 and the resistance in Coil 1 acting as a shading coil during the time between T2 and T3, that decrease may be held to a minimum by maximizing the speed of the motion of the armature 24 to minimize the time between T2 and T3. The resulting magnetic energy is recovered between time T3 and T4. Note that neglecting fringing effects, while neither the flux or flux density preferably changes that much during the time between T2 and T3, the current in Coil 1 will increase, potentially to a relatively large current until terminated at time T3, which conceivably could cause overheating problems in Coil 1 if the duty cycle is high—another reason to use a double acting configuration as in FIG. 1 if a high electrical output (high duty cycle) is required.

Having just described the operation of some of the hydraulically powered electric generators of the present invention as generally schematically illustrated in FIGS. 2(a) through 2(g), certain variations and/or improvements therein can readily be identified. First, as will be noted that in FIGS. 2(b) through 2(d), diode D1 is forward biased, and the forward bias voltage drop is added to the IR voltage drop in Coil 1, unnecessarily reducing the current in, and therefore the shading effect of the coil. To eliminate this forward conduction voltage drop, a solid state switch may be coupled across diode D1 and turned on to effectively eliminate this voltage drop, thereby maximizing the shading effect of the coil. Further, in FIGS. 2(e) and (f), diode D2 similarly injects a forward conduction voltage drop of diode D2 in the circuit charging the battery BAT, and accordingly some improvement in energy recovery can be obtained if another solid state switch is coupled across diode D2 and immediately turned on after diode D1 is disconnected as shown in FIG. 2(e). Diodes D1 and D2 however serve a highly useful function in that they avoid the possibility of an open circuit caused by turning on a solid state switch too late that would cause a collapse of the magnetic field from which the energy was to be recovered, or a momentary short circuit caused by turning on a solid state switch too early, unnecessarily discharging the battery BAT and/or causing other undesirable results.

Figure 4:
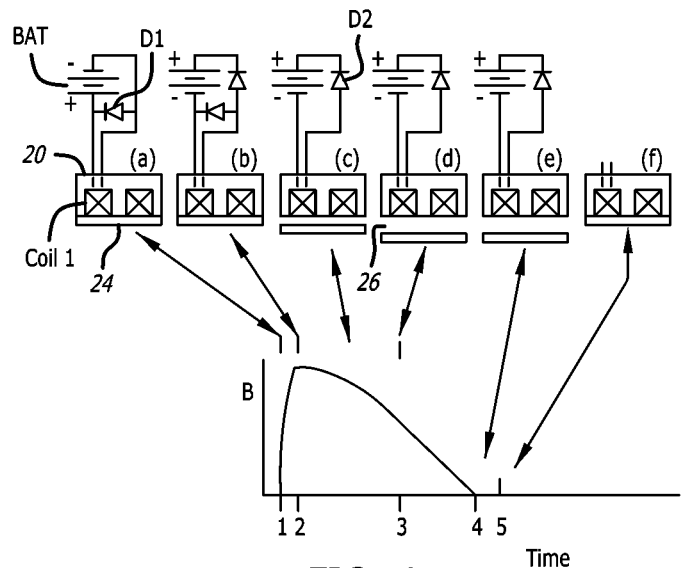
FIG. 4 is a schematic diagram illustrating another method of operating the hydraulically powered electric generators according to one embodiment.

As a further alternate, note that the energy recovery may be initiated early such as by way of example switching diode D1 out of the circuit before the maximum airgap 26 is reached. In the limit, diode D1 in this embodiment would be used in the initial establishment of a magnetic field in FIGS. 4(a) and 4(b), though would be switched out before the armature 24 begins movement. This would result in less energy being temporarily stored in the airgap as a result of the reduced shading affect because of the immediate imposition of a battery voltage in series with Coil 1.

Figure 5:
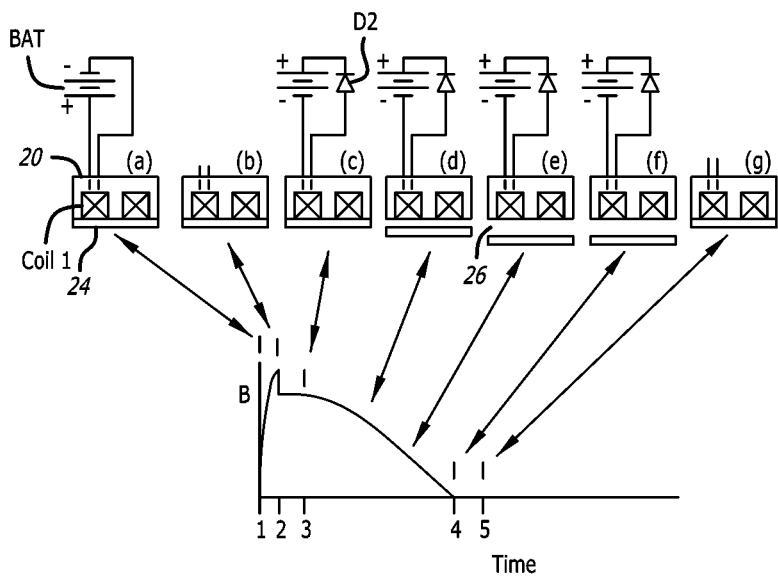
FIG. 5 is a schematic diagram illustrating still another method of operating the hydraulically powered electric generators according to one embodiment.

A still further method of operating the generators of the present invention is illustrated in FIG. 5. Here, after the initial magnetization of FIG. 5(a), the magnetizing force is removed after what may be a very short period, as shown in FIG. 5(b), wherein the zero air gap retentivity of even soft magnetic materials will maintain approximately 80 percent of the flux density achieved during the magnetizing period of FIG. 5(a). This magnetization would occur between time T1 and T2, with a flux density then immediately decreasing at time T2 to a steady state level that the materials could maintain substantially indefinitely. At time T3 after the battery BAT and diode D2 are connected (the battery and diode D2 not affecting the steady state condition set in FIG. 5(b) until an airgap is imposed), an airgap is imposed as in FIGS. 5(c) through 5(f), and the magnetic field will collapse, with the energy therein being recovered by battery BAT through diode D2, with the armature 24 thereafter being returned to the starting position as shown on FIG. 5(g).

Figure 6:
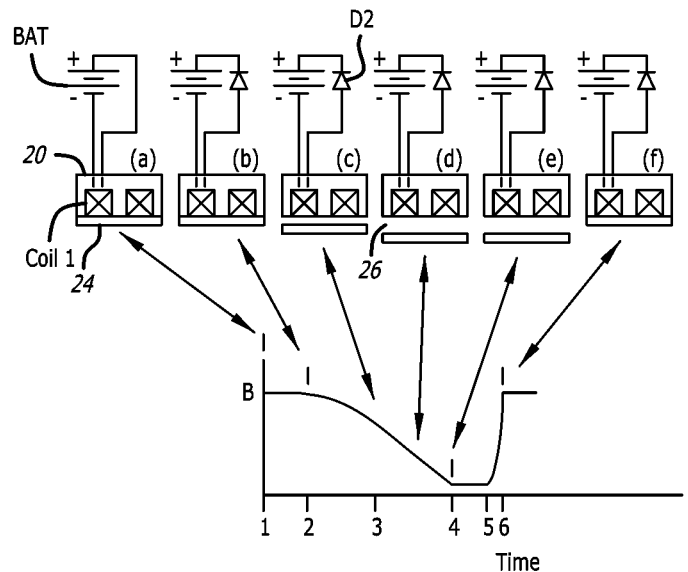
FIG. 6 is a schematic diagram illustrating yet another method of operating the hydraulically powered electric generators according to one embodiment.

Finally one further embodiment of the method of operation of the hydraulically powered electric generators of the present invention will be described. In this embodiment, magnetic materials for the stator 20 and armature 24 are selected to provide a somewhat higher retentivity so that on reestablishing a zero air gap, the initial magnetic field will automatically be reestablished. Since there is no back EMF under these conditions, diode D2 will be back biased and accordingly, the battery BAT and diode D2 may be left in the circuit throughout the entire operation of the hydraulically powered electric generators as illustrated in FIGS. 6(a) through 6((f). Because of the retentivity, there may be a significant flux density in the magnetic circuit including the air gap at time T4 which will remain until the armature 24 is returned to its initial position as shown in FIGS. 6(f) and 6(a). The advantage of this embodiment of course is its simplicity, plus the fact that since the initial magnetization of the magnetic circuit is achieved by the retentivity of the materials, no energy is required to set the initial magnetization and accordingly under no conditions can there be a net negative charging of the battery.

The present invention is ideal in any application wherein a source of liquid under pressure is available, whether that liquid is what would be considered a conventional hydraulic fluid, such as, by way of example, an engine oil, fuel, or even water. One application for the hydraulically powered electric generators of the present invention is in hybrid propulsion systems for motor vehicles wherein various forms of energy may be generated and used and/or stored for later use by way of batteries, hydraulic accumulators, air pressure storage tanks, etc. By way of specific example, engines of the general type disclosed in U.S. Patent Application Publication No. 2017/0022882 and International Application No. PCT/US2018/024374, the disclosures of which are hereby incorporated by reference, provide part of an engine output as hydraulic energy which may be used to power the hydraulically powered electric generators of the present invention. Other engines which may provide most, if not all power output thereof initially as hydraulic energy include free piston engines such as generally in accordance with U.S. Pat. Nos. 8,596,230, 9,464,569 and 9,206,738, the disclosures of which are also hereby incorporated by reference.

Figure 7:
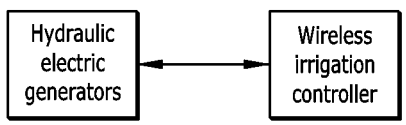
FIG. 7 is a block diagram illustrating an example of an irrigation controller powered by the hydraulic electric generators according to one embodiment.

The present invention has numerous applications beyond hybrid power sources such as internal combustion engines that generate high pressure hydraulic fluid as a direct output of the engine. By way of some specific examples, wireless irrigation systems such as illustrated in FIG. 7 may be powered by the hydraulic electric generators of the present invention. The hydraulic electric generators in a wireless irrigation system may power itself as well as the wireless irrigation controller. In that regard, battery powered irrigation controllers are well known and range from controllers that can require substantial amounts of power to controllers that will operate for extend periods on relatively small batteries.

A block diagram for an irrigation controller powered by hydraulic electric generators of the present invention may be seen in FIG. 7. In such a system either the hydraulic electric generator block or the wireless irrigation controller block or both would incorporate some rechargeable power source, both the electric hydraulic electric generators being turned on as needed to keep that power source charged to continuously operate the clock in the controller and to power the individual control valves operated by the wireless irrigation controller. The advantage of such a system in comparison to a battery powered system is that the hydraulic electric generators could be used to generate substantially any reasonable level of electric power as required to operate the valves of the system, wherein a predetermined battery size will have its limits. Further the hydraulic electric generators can replenish the power substantially indefinitely whereas battery power will have a limited useful life without changing of the batteries. In comparison to solar powered systems, there again, the hydraulic electric generators of the present invention can reliably generate more power than a reasonably sized solar system under all weather conditions and in fact, the system of FIG. 7 could be located within some structure or otherwise covered and still operate with no difficulty. Similarly, it would not be subject to possible vandalism as may occur when someone intentionally covers the solar cells, or the solar cells are accidently covered by dirt, etc.

Other applications could include, by way of example, the recovery of energy otherwise wasted by water regulators such as the water regulators commonly used in residential housing. Here the pressure of the water delivered to a residence from a municipal water supply will vary with time of day and usage of others on the same water supply, with the average pressure at any time depending to a certain extent on the elevation of the home relative to other homes on the same supply. Consequently some homes have a considerably higher average pressure water supply than others, though in most cases, the pressure of the water as supplied, whatever that pressure may be, is reduced to a constant pressure by way of a pressure regulator for each home, generally located where the water supply enters the home. The hydraulic elect of the present invention could readily be used in place of such pressure regulators to recovery the energy wasted by conventional pressure regulators.

Note in the foregoing application that the pressure differential between the supplied water pressure and the regulated water pressure to be provided to the home will vary for the various reasons previously outlined, though the hydraulic electric generators of the present invention may readily be made to operate efficiently over a range of pressure differentials by such techniques as controlling the extent of initial magnetization of the magnetic circuit which in turn will control the differential hydraulic pressure required to operate the hydraulic electric generators (see FIG. 1) as that initial magnetization will determine the force required to move the armature 24. Further, of course, one could use two different sized hydraulic actuators, using the smaller actuators for the higher differential pressures and the larger actuators for the smaller differential pressures, which if combined with control of the initial magnetization, would provide a wide range of operating capabilities in terms of operating pressure differentials.

Referring to FIG. 1 again and using that double acting configuration as an example, note that a single set of high speed values, Valve 1 and Valve 2, might be used to operate multiple individual hydraulic electric generators of the type shown in FIG. 1, or a single set of hydraulic actuators could be used to drive a common armature 24 for multiple individual hydraulic electric generators. In that regard, the size of the individual generators is of course a design choice, though standardizing sizes and using multiple generators in any specific installation can provide scalability and provide a much smoother electric power flow over a range of operating pressure differentials and/or electric power output requirements.

Finally, it should be noted that the general principles of the present invention may readily be applied to electric generators powered by compressible gasses under pressure. In certain applications, compressible gases are stored at high pressure, yet utilized at relatively low pressures as regulated by conventional pressure regulators. Examples include both stationary and mobile applications such as for both combustible and non-combustible gases. One mobile application is in the use of compressed natural gas for powering vehicles including automobiles as well as trucks and buses. In these applications, substantial pressure energy is contained in the high pressure gas, yet all gas utilization is at a modest regulated pressure, with all of the energy represented by the high pressure being wasted in conventional pressure regulation equipment. Utilizing the present invention, however, substantial amounts of that energy can be recovered without otherwise affecting the operation of the system in any way whatsoever. Further, in such applications, it is interesting to note that the flow of the natural gas is maximum when the engine power requirements are maximum, which in turn would cause maximum output of the compressible gas operated electric generators of the present invention. Stationary applications can include manufacturing facilities using acetylene for welding, and noncombustible gases such as nitrogen, argon and other inert gases as part of their manufacturing and processing systems. These, of course, are mere examples of applications wherein a wide range of applications can be found for electric generators of this type of a single given capacity. Further the ability of the electric generators of the present invention to be adapted to varying differential pressures allows the electric generators to operate on very high differential pressures (pressurized gas storage tank full) to quite low differential pressures (pressurized gas storage tank substantially empty) without a huge drop-off in efficiency in the energy conversion. In that regard, note that gases that cannot be liquefied for a particular application because of the low temperatures and perhaps long storage times required are frequently stored at pressures well over 1000 psi, perhaps 2000 psi or more. In such cases there is no need to operate the present invention generators directly on such high pressure differentials. Instead, such pneumatically operated generators might be series connected, so to speak, for high pressure differentials, and reconnected as the pressure in the storage vessel decreases. By way of example, assume that the initial storage pressure is 2400 psi, and the pneumatically operated generator system was comprised of eight individual generators. Initially, the eight generators could be connected to the pressure source in series, with each operating on a pressure differential of 300 psi. Then as the pressure in the storage vessel drops to 1200 psi and the operating pressure differential of each individual generator drops to 150 psi, the eight generators could be automatically recoupled to the pressure source as four pairs operating in series, etc., so that each generator operates on a pressure differential of 300 psi again. This not only make more efficient use of the pressure energy in the compressible gas, but also adapts the volume flow capacity of the generator system to varying requirements, as assuming a constant usage of the gas in terms of mass flow from the pressure vessel, the rate of gas flow in volume per unit of time from the pressure source will be inversely proportional to the pressure of the gas. Of course this example is merely illustrative of the concept, though does point out another of the very numerous ways that the individual generators of the present invention can be designed, configured and adapted for a wide variety of applications.

Thus the present invention has a number of aspects, which aspects may be practiced alone or in various combinations or sub-combinations, as desired. Also while certain preferred embodiments of the present invention have been disclosed and described herein for purposes of exemplary illustration and not for purposes of limitation, it will be understood by those skilled in the art that various changes in form and detail may be made therein without departing from the spirit and scope of the invention.

What is claimed is:

1. A method of operating hydraulically powered electric generators comprising opposing stators spaced apart by an armature, the method comprising:

positioning the armature against a first stator;

establishing a conduction path through a coil of the first stator;

hydraulically moving the armature away from the first stator to capture electrical energy resulting from a collapse in magnetic field in the first stator and the armature;

magnetically holding the armature against the first stator for a specific time period;

coupling the coil of the first stator to an electrical energy utilization or storage device having a first polarity; and after the specific time period, disconnecting the electrical energy utilization or storage device, and then hydraulically moving the armature away from the first stator to initiate an opening of an air gap between the first stator and the armature;

wherein a first switching device coupled to the coil of the first stator is forward biased to provide the conduction path through the coil of the first stator.

2. The method of claim 1, further comprising before a maximum air gap between the first stator and the armature is achieved, reconnecting the electrical energy utilization or storage device, wherein the electrical energy utilization or storage device has a second polarity opposite of the first polarity.

3. The method of claim 2, wherein the electrical energy utilization or storage device is coupled to the coil of the first stator through a second switching device to pass electrical current to charge the electrical energy utilization or storage device.

4. The method of claim 3, further comprising when the maximum air gap between the first stator and the armature is achieved, switching out the first switching device to allow the magnetic field to collapse, the energy in the magnetic field being captured through the second switching device to charge the electrical energy utilization or storage device.

5. The method of claim 4, further comprising injecting a forward conduction voltage drop of the second switching device charging the electrical energy utilization or storage device.

6. The method of claim 1, wherein the electrical current in the coil of the first stator and the flux yielding the flux density linking the first stator and the armature rise quickly during the specific time period.

7. The method of claim 1, wherein the coil of the first stator has a shady effect on the magnetic field in the first stator and the armature, and wherein a circulating current is generated in the coil to resist and slow the collapse of the magnetic field.

8. The method of claim 1, wherein the armature is moved away from the first stator to a second stator.

9. The method of claim 1, wherein the electrical energy utilization or storage device is a battery.

10. The method of claim 1, wherein position of the armature is controlled by hydraulic pistons comprised in the hydraulically powered electric generators, each hydraulic piston coupled to a source of high pressure hydraulic fluid and a low pressure reservoir or vent through a three-way valve.

11. The method of claim 1, further comprising coupling the coil of the first stator to the electrical energy utilization or storage device through a second switching device, the electrical energy utilization or storage device having a second polarity opposite of the first polarity.

12. The method of claim 11, further comprising after the specific time period, switching out the first switching device, and then hydraulically moving the armature away from the first stator to initiate an opening of an air gap between the first stator and the armature, whereby less energy is temporarily stored in the air gap.

13. The method of claim 1, further comprising reconnecting the electrical energy utilization or storage device and a second switching device, wherein the coil of the first stator is coupled to the electrical energy utilization or storage device through the second switching device, whereby energy is recovered by the electrical energy utilization or storage device through the second switching device.

14. The method of claim 1, wherein the armature is hydraulically controlled using hemp, water, or ammonia (NH3).

15. A method of operating hydraulically powered electric generators comprising opposing stators spaced apart by a hydraulically controlled armature and an air gap, each of the opposing stators having at least one coil, the method comprising:

positioning the hydraulically controlled armature against one of the stators;

establishing electrical current in a coil of the stator to establish a magnetic field in the stator and the armature, during which a first diode coupled to the coil is reverse biased;

establishing a conduction path through the coil, wherein the first diode is forward biased to provide the conduction path through the coil; and hydraulically forcing the armature away from the stator to capture electrical energy resulting from a collapse in magnetic field in the stator and the armature.

16. The method of claim 15, further comprising:

magnetically holding the armature against the stator for a specific time period; and shortly after the specific time period, disconnecting a battery connected to the coil and then hydraulically forcing the armature away from the stator to initiate a rapid opening of the air gap, wherein the battery includes a first polarity.

17. The method of claim 16, further comprising before a maximum air gap is achieved, reconnecting the battery with a second polarity opposite of the first polarity, wherein the battery is connected through a second diode to pass electrical current to charge the battery and to block electrical current tending to discharge the battery.

18. The method of claim 17, further comprising when the maximum air gap is achieved, disconnecting the first diode to allow the magnetic field to collapse, wherein energy in the magnetic field is captured through the second diode to charge the battery.

19. The method of claim 15, further comprising:

magnetically holding the armature against the stator for a specific time period; and prior to hydraulically forcing the armature away from the stator, switching out the first diode to reduce a shading effect of the coil.

20. The method of claim 15, wherein the armature is hydraulically controlled using hemp, water, or ammonia (NH3).

21. A method of operating hydraulically powered electric generators comprising opposing stators spaced apart by a hydraulically controlled armature and an air gap, each of the opposing stators having at least one coil, the method comprising:

causing the hydraulically controlled armature to position against one of the stators;

establishing a conduction path through a coil of the stator, wherein the coil is connected to a battery;

disconnecting the battery from the coil after the conduction path is established for a first specific time period;

after a second specific time period, reconnecting the battery and a diode wherein the battery is connected to the coil through the diode; and then hydraulically moving the armature away from the stator to capture electrical energy resulting from a collapse in magnetic field in the stator and the armature.

22. The method of claim 21, wherein the armature is hydraulically controlled using hemp, water, or ammonia (NH3).

23. A method of operating hydraulically powered electric generators comprising opposing stators spaced apart by a hydraulically controlled armature and an air gap, each of the opposing stators having at least one coil, the method comprising:

causing the hydraulically controlled armature to position against one of the stators;

establishing a conduction path through a coil of the stator for a specific time period, the coil being connected to a battery through a diode, wherein the diode is reverse biased; and then hydraulically moving the armature away from the stator to initiate an opening of the air gap and to capture electrical energy resulting from a collapse in magnetic field in the stator and the armature.

24. The method of claim 23, wherein the armature is hydraulically controlled using hemp, water, or ammonia (NH3).

* * * * *